(12) United States Patent  
Batz et al.

(10) Patent No.: US 7,650,402 B1  
(45) Date of Patent: Jan. 19, 2010

(54) SYSTEM AND METHOD FOR TRACKING END USERS IN A LOADBALANCING ENVIRONMENT

(75) Inventors: Robert M. Batz, Raleigh, NC (US); Chris O'Rourke, Apex, NC (US)

(73) Assignee: Cisco Technology, Inc., San Jose, CA (US)

( * ) Notice: Subject to any disclaimer, the term of this patent is extended or adjusted under 35 U.S.C. 154(b) by 768 days.

(21) Appl. No.: 10/606,438

(22) Filed: Jun. 25, 2003

(51) Int. Cl.
*G06F 13/00* (2006.01)

(52) U.S. Cl. ........................... 709/224; 718/105
(58) Field of Classification Search ................ 718/105; 709/224
See application file for complete search history.

(56) References Cited

U.S. PATENT DOCUMENTS

| | | | |
|---|---|---|---|
| 5,181,236 A | 1/1993 | LaVallee et al. ............... 379/67 |
| 5,774,660 A * | 6/1998 | Brendel et al. ............... 709/201 |
| 5,905,736 A | 5/1999 | Ronen et al. ................. 370/546 |
| 5,951,694 A | 9/1999 | Choquier et al. .............. 714/15 |
| 5,956,391 A | 9/1999 | Melen et al. ................. 379/114 |
| 5,970,477 A | 10/1999 | Roden ......................... 705/32 |
| 6,006,264 A | 12/1999 | Colby et al. ................. 709/226 |
| 6,016,305 A | 1/2000 | Borst et al. ................. 370/234 |
| 6,047,051 A | 4/2000 | Ginzboorg et al. .......... 379/130 |
| 6,128,642 A | 10/2000 | Doraswamy et al. ........ 709/201 |
| 6,128,657 A | 10/2000 | Okanoya et al. ............ 709/224 |
| 6,137,777 A | 10/2000 | Vaid et al. ................... 370/230 |
| 6,185,619 B1 | 2/2001 | Joffe et al. .................. 709/229 |
| 6,201,962 B1 | 3/2001 | Sturniolo et al. ............ 455/432 |
| 6,249,801 B1 * | 6/2001 | Zisapel et al. .............. 718/105 |
| 6,263,368 B1 | 7/2001 | Martin ......................... 709/224 |
| 6,266,335 B1 * | 7/2001 | Bhaskaran .................. 370/399 |
| 6,327,622 B1 | 12/2001 | Jindal et al. ................. 709/228 |
| 6,330,602 B1 | 12/2001 | Law et al. .................... 709/224 |
| 6,393,458 B1 | 5/2002 | Gigliotti et al. ............. 709/203 |
| 6,434,618 B1 | 8/2002 | Cohen et al. ................ 709/228 |
| 6,442,165 B1 | 8/2002 | Sitaraman et al. ........ 370/395.4 |
| 6,473,802 B2 | 10/2002 | Masters ....................... 709/229 |
| 6,484,143 B1 | 11/2002 | Swildens et al. .............. 705/1 |

(Continued)

FOREIGN PATENT DOCUMENTS

WO    WO 98/26381    12/1997

(Continued)

OTHER PUBLICATIONS

Information Sciences Institute, "Internet Protocol, DARPA Internet Program Protocol Specification," Univ. of Southern California, 49 pgs., Sep. 1981.

(Continued)

*Primary Examiner*—Kenneth R Coulter
(74) *Attorney, Agent, or Firm*—Baker Botts L.L.P.

(57) ABSTRACT

A method for tracking information in a network environment is provided that includes receiving a packet included within a request that is associated with an end user and communicating the packet to a selected one of a plurality of gateways. An object may be built that correlates an internet protocol (IP) address associated with the end user to the selected gateway such that the object may be used to direct subsequently received packets associated with the end user to the selected gateway. Subsequently received packets may be directed based on end-user IP address information included in the subsequently received packets.

22 Claims, 1 Drawing Sheet

U.S. PATENT DOCUMENTS

| | | | |
|---|---|---|---|
| 6,493,341 B1 * | 12/2002 | Datta et al. | 370/392 |
| 6,601,084 B1 * | 7/2003 | Bhaskaran et al. | 718/105 |
| 6,665,702 B1 * | 12/2003 | Zisapel et al. | 718/105 |
| 6,718,359 B2 * | 4/2004 | Zisapel et al. | 718/105 |
| 7,139,926 B1 * | 11/2006 | Madhav et al. | 714/4 |
| 7,346,676 B1 * | 3/2008 | Swildens et al. | 709/223 |
| 7,441,045 B2 * | 10/2008 | Skene et al. | 709/241 |
| 7,523,181 B2 * | 4/2009 | Swildens et al. | 709/223 |
| 2002/0059114 A1 | 5/2002 | Cockrill et al. | 705/27 |
| 2003/0172145 A1 * | 9/2003 | Nguyen | 709/223 |
| 2004/0117438 A1 * | 6/2004 | Considine et al. | 709/203 |

FOREIGN PATENT DOCUMENTS

| | | |
|---|---|---|
| WO | WO 99/31610 | 12/1998 |
| WO | WO 99/41895 | 8/1999 |

OTHER PUBLICATIONS

S. Deering, "Host Extensions for IP Multicasting," Stanford University, 17 pgs., Aug. 1989.

IBM Technical Disclosure Bulletin, "Computerized Call Return Feature"; vol. 28, No. 11;pp. 4897-4901; IBM Corp. (5 pgs), Apr. 1986.

PCT; International Search Report and Written Opinion; (IS/EPO) for PCT/US2006/033077 (13 pages), Feb. 14, 2007.

* cited by examiner

SYSTEM AND METHOD FOR TRACKING END USERS IN A LOADBALANCING ENVIRONMENT

TECHNICAL FIELD OF THE INVENTION

This invention relates in general to the field of communications and more particularly to a system and method for tracking end users in a loadbalancing environment.

BACKGROUND OF THE INVENTION

Data networking architectures have grown increasingly complex. In addition, the increase in clients or end users wishing to communicate in a data networking environment has caused many networking configurations and systems to respond by adding elements to accommodate the increase in networking traffic. Communication tunnels may be used in order to establish or to gain access to a network, whereby an end user or an object is tracked through a central location and provides a communication platform for the end user for that communication session.

As the subscriber base of end users increases, proper routing and efficient management of communication sessions and data flows becomes even more critical. Several components are generally implicated in loadbalancing scenarios and, in certain instances, many of these components are delegated a disproportionate number of duties. This overburdening may decrease throughput and inhibit the flow of network traffic, causing congestion or bottlenecks in the system. Additionally, the overwhelming burden on a single element in the communications flow may decrease bandwidth capabilities, as the overtaxed component is forced to work its way through each of its tasks and duties before being able to accommodate additional communications tunnels or end users. Strains on a central location not only slow network traffic, but such a reliance on a single central node may create severe problems in situations where the central node fails or is otherwise unable to perform all of its assigned duties.

SUMMARY OF THE INVENTION

From the foregoing, it may be appreciated by those skilled in the art that a need has arisen for an improved communications approach that provides for a reduction in the burden placed on a loadbalancer associated with communications between multiple end points or nodes. In accordance with one embodiment of the present invention, a system and method for tracking an end user in a network environment are provided that greatly reduce disadvantages and problems associated with conventional loadbalancing techniques.

According to one embodiment of the present invention, there is provided a method for tracking information in a network environment that includes receiving a packet included within a request that is associated with an end user and communicating the packet to a selected one of a plurality of gateways. An object may be built that correlates an internet protocol (IP) address associated with the end user to the selected gateway such that the object may be used to direct subsequently received packets associated with the end user to the selected gateway. Subsequently received packets may be directed based on end user IP information included in the subsequently received packets.

Certain embodiments of the present invention may provide a number of technical advantages. For example, according to one embodiment of the present invention a communications approach is provided that allows a loadbalancer to track end user sessions based solely on their IP addresses, instead of tracking end user sessions on a per-flow basis. This reduction in responsibility for the loadbalancer operates to increase throughput, as two points or nodes may efficiently communicate while the loadbalancers involved need only inspect the destination and source IP addresses. This may also reduce the number of central processing unit (CPU) cycles that may be intensive and that may require additional work to be performed by the loadbalancer. Accordingly, the loadbalancer may be relegated to simplified information transfer and object building that may be used to correlate an end user with a selected gateway. The removal of per-flow tracking by the loadbalancer may further alleviate its responsibilities such that greater bandwidth may be accommodated for in the network.

Yet another technical advantage associated with one embodiment of the present invention is also a result of IP address-based tracking. The decreased reliance on flow tracking by the loadbalancer conserves memory resources. This is because the loadbalancer does not need to store flow information to load balance user sessions in the network. The loadbalancer may reduce identification of the end user to a 4-byte IP address (e.g. using internet protocol version four). This procedure may better allocate network resources because per-flow information is no longer needed to be maintained by the loadbalancer. In addition, the decreased dependency on the loadbalancer allows for improved failover characteristics such that, if the loadbalancer should become dysfunctional or non-operational, associated communication sessions may not necessarily be lost. Furthermore, redundancy problems are less challenging because of the reduction of duties assigned to the loadbalancer.

Still another technical advantage associated with one embodiment of the present invention relates to the configuration of the loadbalancer. The configuration employed is simplified in accordance with the teachings of the present invention such that less hardware, memory, table space, and/or application specific integrated circuits (ASICS) are needed to effectuate the operations of the loadbalancer. This in turn may allow for better space allocations, which may allow additional end users to be accommodated, as net aggregate capacity/throughput is thereby increased. This may also result in greater throughput being provided to each of the corresponding gateways. In essence, layer-three path enforcement may offer more scalable loadbalancing with higher throughput and total host capacity. This efficiency improvement is applicable to a number of communication environments and may further provide a scaling ability as end user subscription bases grow. Certain embodiments of the present invention may enjoy some, all, or none of these advantages. Other technical advantages may be readily apparent to one skilled in the art from the following figures, description, and claims.

BRIEF DESCRIPTION OF THE DRAWINGS

To provide a more complete understanding of the present invention and features and advantages thereof, reference is made to the following description, taken in conjunction with the accompanying figures, wherein like reference numerals represent like parts, in which.

DETAILED DESCRIPTION OF EXAMPLE EMBODIMENTS OF THE INVENTION

Figure 1:
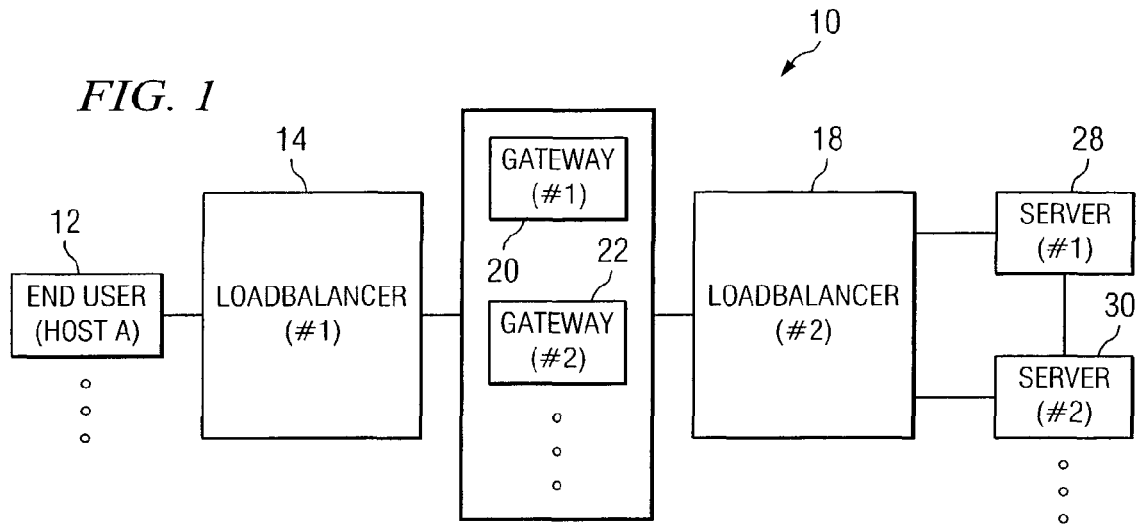
FIG. 1 is a simplified block diagram of a communications system for tracking an end user in a loadbalancing environment in accordance with one embodiment of the present invention.

FIG. 1 is a simplified block diagram of a communication system 10 for tracking an end user 12 in a network environment. Communication system 10 may include end user 12 (which may also be referred to herein as 'Host A'), a set of loadbalancers 14 and 18 (represented as loadbalancer #1 and loadbalancer #2), a set of gateways 20 and 22 (represented as gateway #1 and gateway #2), and a set of servers 28 and 30 (represented as server #1 and server #2). Note that the designation of numerous elements included within communication system 10 as either '#1' or '#2' is arbitrary and has been provided for purposes of offering a clear discussion of some of the teachings of the present invention. These designations should not be construed in any way to limit the broad scope and considerable adaptability of the present invention in any number of communications environments.

FIG. 1 may be generally configured or arranged to represent a 2.5 G communication architecture applicable to a Global System for Mobile (GSM) environment in accordance with a particular embodiment of the present invention. However, the 2.5G architecture is offered for purposes of example only and may alternatively be substituted with any suitable networking protocol or arrangement that provides a communicative platform for communication system 10. For example, communication system 10 may cooperate with any version of a gateway packet radio service (GPRS) tunneling protocol (GTP) that includes an ability to track an internet protocol (IP) address. Communication system 10 may also be inclusive of first generation or 3G architectures that provide similar features for identifying an IP address. Such applications for communication system 10 may extend beyond the mobile space, such as, for example, in firewall architectures.

In accordance with the teachings of the present invention, communication system 10 operates to alleviate the responsibilities associated with loadbalancers 14 and 18 in providing efficient communication using per-end user IP address tracking. In other scenarios, gateway loadbalancing is generally accomplished using flow-based loadbalancers that track each layer-four flow generated by a host. The loadbalancers can associate each of these flows to a gateway, which is tracking the host's traffic. Flow tracking alone is not sufficient to enforce host-to-gateway binding, so an additional table is generally created to map host addresses to the appropriate gateway. The combination of flow tracking and host tracking functionally enforces the gateway's requirements of binding a host's traffic to a particular gateway.

In contrast to flow tracking, communication system 10 offers enhanced path enforcement in each of loadbalancers 14 and 18 by tracking only the host's IP address (layer-three source or destination, depending on which side of the gateway the loadbalancer is positioned and the direction of the flow of the packet, relative to the gateways). Thus, end user 12 information may be tracked so that packets from the host side that are received at loadbalancer 14 (where the source information is equal to the IP address of Host A), may be directed to gateway (#1) 20. From the origin side, where the destination IP address is equal to Host A, the packets may be routed to gateway (#1) 20. Thus, only 8-bytes of information is needed in order to properly direct packets (4-bytes for the IP address of the client and 4-bytes for the IP address of the associated gateway). Fewer elements are being tracked in the loadbalancing process.

Thus, the amount of information that needs to be stored and searched within loadbalancers 14 or 18 is minimized, thereby increasing the capacity of the loadbalancer and, ultimately, the throughput of the gateway cluster.

Communication system 10 allows each loadbalancer 14 and 18 to load balance end user data sessions based on the host IP address, instead of load balancing end user data sessions on a per-flow basis. This reduction in responsibility for loadbalancers 14 and 18 increases throughput because multiple points or nodes within the network may efficiently communicate while loadbalancers 14 and 18 need only inspect the destination and source IP addresses. This may also reduce the number of central processing unit (CPU) cycles. Accordingly, loadbalancers 14 and 18 may perform simplified information transfer and object building that may be used to correlate end user 12 with a selected gateway 20 or 22. The removal of per-flow tracking by loadbalancers 14 and 18 may further alleviate their responsibilities such that greater data throughput may be achieved in the network.

The decreased tracking performed by loadbalancers 14 and 18 also conserves memory resources. This is because loadbalancers 14 and 18 do not need to look up flow keys or perform other equivalent operations. Loadbalancers 14 and 18 may simply load balance a user data flow based on a search for a host IP address in the host IP address table. Note that IP version four (IPv4) addresses are four bytes and IP version six (IPv6) addresses are sixteen bytes. With respect to IPv6, storage may be reduced to sixteen bytes. The advantage in implementing communication system 10 generally remains across various layer three protocols/versions (e.g. IPX). This procedure may better allocate network resources because per-flow information no longer needs to be maintained by loadbalancers 14 and 18. Additionally, the configuration of loadbalancers 14 and 18 is also advantageous because of its simplified architecture. Loadbalancers 14 and 18 may be designed such that less hardware, memory, table space, and application specific integrated circuits (ASICS) are needed to effectuate their operations. This increase in space allocation may allow for additional end users to be accommodated, as an increase in net aggregate capacity/throughput is thereby provided. This may also result in greater throughput being provided to the corresponding gateways 20 and 22, which are not burdened by sophisticated tracking operations. Layer-three path enforcement may offer more scalable loadbalancers 14 and 18 and gateway clusters 20 and 22. This efficiency strategy is adaptable to a number of communications environments, and may further provide the ability to scale a given system as end user bases grow. The combination of flow-less loadbalancing and end-user IP address stickying accomplishes this function without tracking cumbersome communication flows.

End user 12 is a client or a customer wishing to initiate a communication in communication system 10. End user 12 may be inclusive of devices used to initiate a communication, such as a computer, a personal digital assistant (PDA), a laptop or an electronic notebook, a telephone, a mobile station, or any other device, component, element, or object capable of initiating voice or data exchanges within communication system 10. End user 12 may also be inclusive of a suitable interface to the human user, such as a microphone, a display, a keyboard, or other terminal equipment (such as for example an interface to a personal computer or to a facsimile machine in cases where end user 12 is used as a modem). End user 12 may also be any device that seeks to initiate a communication on behalf of another entity or element, such as a program, a database, or any other component, device, element, or object capable of initiating a voice or a data exchange within communication system 10. Data, as used herein in this document, refers to any type of numeric, voice, video, or script data, or any type of source or object code, or any other suitable information in any appropriate format that may be communicated from one point to another.

End user 12 may be coupled to a suitable IP network in order to access loadbalancer 14. The IP network represents a series of points or nodes of interconnected communication paths for receiving and transmitting packets of information that propagate through communication system 10. The IP network may offer a communicative interface between end user 12 and selected locations within the network. The IP network may be any local area network (LAN), wireless local area network (WLAN), metropolitan area network (MAN), virtual private network (VPN), wide area network (WAN), or any other appropriate architecture or system that facilitates communications in a network environment. The IP network may implement a transmission control protocol (TCP)/IP or a user datagram protocol (UDP)/IP communication language protocol in particular embodiments of the present invention. However, the IP network may alternatively implement any other suitable communication protocol for transmitting and receiving data packets within communication system 10.

Loadbalancers 14 and 18 are elements or devices that receive requests from one or more end users 12 and then distribute those requests to the next available server, gateway, or node. The available node may be any computer or device on a network that manages network resources, processes data, or receives information. For example, the server or node may be a selected one of a plurality of gateways 20 and 22 included within a gateway cluster. The loadbalancing decisions may be executed based on suitable algorithms, hardware, or software provided in loadbalancers 14 and 18. Loadbalancers 14 and 18 may also include suitable hardware and software for directing data or information in communication system 10. Additionally, the software or hardware within loadbalancers 14 and 18 may operate to build and store objects that correlate an IP address of end user 12 with a selected gateway 20 or 22. The correlation may be stored in a suitable table format that includes (in one example) four bytes allocated for the IP address of end user 12 being assigned to gateway 20 or 22. The IP address may be associated with version four (IPv4), version six (IPv6), or any other suitable communications protocol. Alternatively, the table may be replaced by any suitable element, guide, record, file, or object operable to store the correlation between an IP address and an assigned gateway.

Loadbalancers 14 and 18 may also perform other suitable loadbalancing tasks, such as dividing the amount of work that an element has to do between two or more elements, ensuring more work gets done in the same amount of time and, in general, end users 12 can be served more quickly. Loadbalancers 14 and 18 may include any appropriate hardware, software, (or a combination of both) or any appropriate component, device, element, or object that suitably manages information traffic in a network environment. Additionally, any of the operations of gateways 20 and 22 may be assisted by loadbalancers 14 and 18 where appropriate and in accordance with particular needs.

In operation of an example embodiment, loadbalancers 14 and 18 may execute loadbalancing decisions for selected end users based on their IP addresses. From the perspective of loadbalancer 14 (#1), the end-user IP information may be checked and, based on that end-user IP information, end user 12 may be assigned to gateway (#1) 20. Thus, loadbalancer 14 may build an object to be included in a table that is stored in loadbalancer 14 such that subsequently received packets are directed to the same gateway. From the perspective of loadbalancer (#2) 18, the end-user IP address information within a packet may be checked. The first packet received by loadbalancer (#2) 18 (from the server perspective of the network, beyond gateways 20 and 22) may initiate the building of an object to be stored by loadbalancer (#2) 18. The object may again correlate an IP address to end user 12 such that subsequently received packets are directed to the same gateway that handled the initial packet. In this sense, loadbalancing is being effectuated based solely on the end-user IP address (source IP or destination IP, depending on packet flow direction). Additional details relating to this process are provided below with reference to FIG. 2.

Gateways 20 and 22 are networking elements that may perform any suitable operation in the network for one or more hosts that may each have a unique IP address. The hosts are end-users or end stations in the network that seek to communicate with each other or with another network entity or node. Gateways 20 and 22 may be part of a gateway cluster or single independent units. Gateways 20 and 22 may be a firewall, an intrusion detection system or element, a switch, a client service packet gateway (CSPG), a GPRS support node (GGSN), a packet data serving node (PDSN), a Layer-two tunneling protocol network server (LNS), or any other suitable device, component, object, node, or element operable to perform some function in a network environment.

Traffic may come from an appropriate Host A (e.g. end user 12), and loadbalancer (#1) 14 may then assign Host A to gateway (#1) 20. The function of each of loadbalancers 14 and 18 may be to ensure that traffic to and from Host A goes through the proper gateway (i.e. the one that has been assigned or stickied and provided in an object, which may be stored in a table within loadbalancer 14 or 18). Within many current existing network architectures, packet gateway functions may require that all IP traffic sourced from, or destined to, a particular host's IP address must pass through the same gateway. Gateways 20 and 22 may perform a variety of per-host functions on the traffic of each host based on the identity of end user 12 (i.e. to what services or functions he/she is entitled or subscribed). Examples of these per-host operations are: network access/aggregation (e.g. PDSN, GGSN, LNS, dial, etc.), transparent content optimization transformation (e.g. WAP, optimization engines), security (e.g. secure sockets layer (SSL) termination, and firewalls), and personalized services and billing (e.g. CSPG). Increasing bandwidth and growing subscriber bases, as well as a demand for redundant gateway functions, have contributed to the need for loadbalancing gateways that perform such functions.

A CSPG is a client-aware device that may provide or offer some service or feature to end user 12. Such services (provided by a CSPG or either of gateways 20 and 22) may be based on an effective mapping between an end-user IP address of a given request packet and a user profile. These client-aware devices, reflected by gateways 20 and 22, may utilize the end-user IP address in providing services to end user 12. There are a number of reasons why a device or a component would want to identify the source or end user 12 associated with a communication session. For example, some devices may wish to identify end user 12 for authorization purposes. In another example, a device may wish to maintain user profiles to provide for accounting records (for example per-user accounting) or to provide for content billing information. Alternatively, a device or a component may use an identifier to provide for any other type of suitable client-aware service, tool, or feature according to particular needs of network components or equipment. Additional services may be related to areas such as routing, permissions or access granting mechanisms, accounting, priority, billing information, firewalling, content filtering, or any other suitable parameters or policies where user-aware characteristics serve as a basis for network service implementation.

In other embodiments, gateways 20 and 22 may be provided and be used to terminate an end user's Layer-two point to point protocol (PPP) session and to actually assign the IP addresses. In such a case, a simple routing may be executed at loadbalancer (#1) 14, whereby one set of IP addresses may be directed to gateway (#1) 20 and another set of IP addresses may be directed to gateway (#2) 22. In other cases, gateways 20 and 22 may not be performing the address assignment, or the address pool may not be conducive to such segmenting amongst the gateways involved.

Servers 28 and 30 are locations in the network sought to be accessed by end user 12. Servers 28 and 30 may be considered as origin servers and include any suitable information or data to be accessed or communicated to end user 12. For example, server 28 could by yahoo.com, which may be operable to serve up web pages based on a request initiated by end user 12. Alternatively, servers 28 and 30 may be any other suitable element, location, or object sought to be accessed by end user 12.

Figure 2:
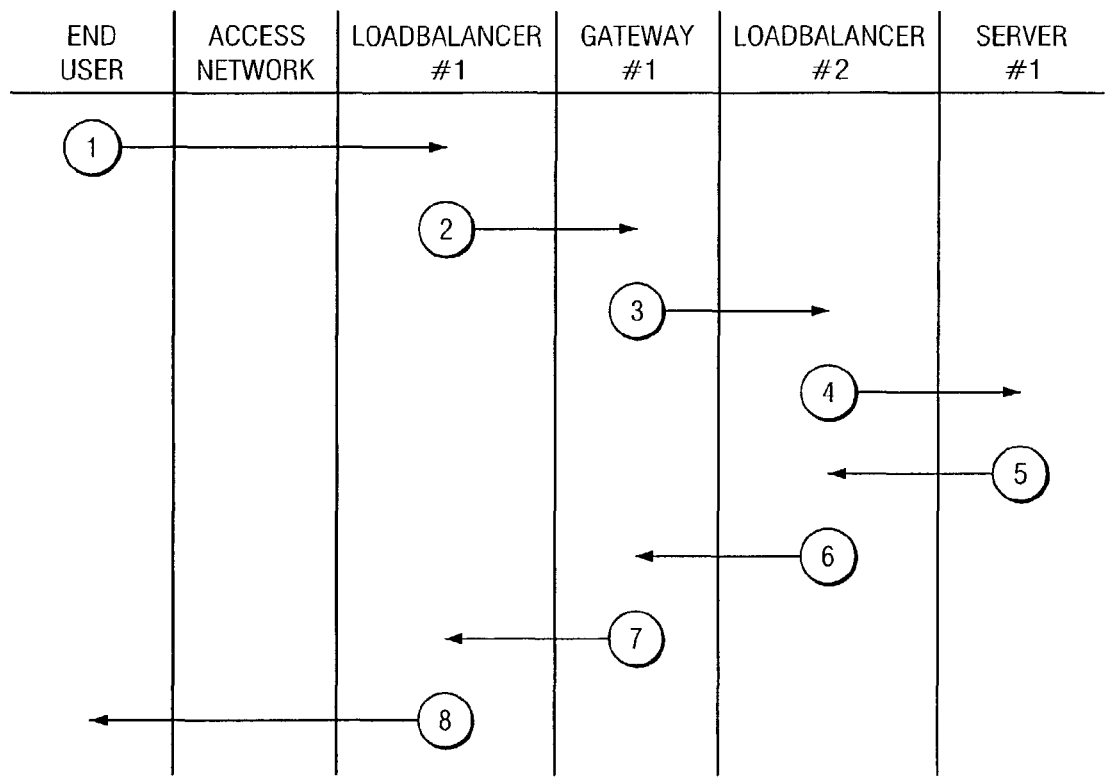
FIG. 2 is a simplified timing diagram illustrating an example interaction between multiple elements that may be included in the communication system.

FIG. 2 is a simplified timing diagram illustrating an example interaction between multiple elements that may be included in communication system 10. The timing diagram may begin at step 1, where an end user initiates a request for a web page to be provided by yahoo.com. The request may be received by loadbalancer (#1) 14, which may build an object that correlates the end user's IP address to the selected gateway. Loadbalancer (#1) 14 may then forward the packet/request on to gateway (#1) 20 at step 2.

In the example embodiment used for discussion and teaching purposes only, gateway (#1) 20 is a firewall. The firewall may generally seek to view all traffic to and from Host A and may also perform a number of other appropriate tasks, such as bandwidth monitoring for example. Such an operation could be tied into a billing system that may only allow a certain number of bytes to be delivered to an end user: denying service/connectivity beyond a certain amount of received data.

At step 3, gateway (#1) 20 may decide to forward the packet on to loadbalancer (#2) 18, which may forward the packet on to the appropriate server, at step 4. Loadbalancer (#2) 18 may view a MAC address (Layer-two) associated with the packet in order to glean its source. In the example provided, a TCP connection may be initiated by the end user. Thus, at step 5, server 28 may return the requested packet to loadbalancer (#2) 18, which has already built an appropriate object that correlates the end user's IP address to the selected gateway. Loadbalancer (#2) 18 may inspect the destination information in subsequently received packets in order to forward the packet to the appropriate gateway that is responsible for handling or processing information for the particular end user. Note that in other scenarios, loadbalancer (#2) 18 may opt to build an object when it receives any packet associated with Host A for the first time. Both loadbalancers 14 and 18 are capable of building objects at any appropriate time or receiving information from an external element that provides information relating to locations to where incoming packets should be routed.

At step 6, loadbalancer (#2) 18 then forwards the packet to gateway (#1) 20, which may forward the packet on to loadbalancer (#1) 14 at step 7. Alternatively, step 7 may be avoided entirely in cases where the requested packet is delivered directly to the end user that requested the packet. Subsequently received packets may be properly directed by loadbalancers 14 and 18 based on end-user IP address information. The look-up is based on the end-user IP information the 'second time' this information is seen by the processing loadbalancer. A loadbalancing function is being provided in order to enforce the requirement that all traffic to and from a host needs to be routed in a certain manner. The object that was built by the participating loadbalancer is used for purposes of enforcement.

Some of the steps illustrated in FIG. 2 may be changed or deleted where appropriate and additional steps may also be added to the flowchart. These changes may be based on specific communication architectures or particular interfacing arrangements and configurations of associated elements and do not depart from the scope or the teachings of the present invention.

Although the present invention has been described in detail with reference to particular communications, communication system 10 may be used for any clustered gateway architecture with requirements for load balancing all data traffic for a user to a single gateway. Any suitable communications that involve the use of end user 12 and network communications may benefit from the teachings of the present invention, as elements such as gateways 20 and 22 have only been offered for purposes of example and should not be construed to limit the scope of the present invention in other potential environments. In addition, communication system 10 may be extended to any scenario for source or destination information associated with end user 12 that is capable of being discerned. This may be inclusive of Ethernet, token-ring, and other suitable protocols, architectures, configurations, and arrangements where appropriate and in accordance with particular needs.

Numerous other changes, substitutions, variations, alterations, and modifications may be ascertained by those skilled in the art and it is intended that the present invention encompass all such changes, substitutions, variations, alterations, and modifications as falling within the spirit and scope of the appended claims. Moreover, the present invention is not intended to be limited in any way by any statement in the specification that is not otherwise reflected in the appended claims.

What is claimed is:

1. An apparatus, comprising:
   a loadbalancer operable to:
   receive a packet included within a request made by an end user requesting information from a server;
   assign the packet to a selected one of a plurality of gateways based on an Internet Protocol (IP) address of the end user making the request, the selected gateway configured to utilize the IP address to provide an accounting service to the end user;
   build an object that correlates the IP address of the end user making the request to the selected gateway, the object used to direct subsequently received packets for the end user to the selected gateway;
   direct the subsequently received packets based on the object and end user IP address information included in the subsequently received packets;
   track a user data flow according to the IP address of the object; and
   load balance the user data flow based on the tracking according to the IP address.

2. The apparatus of claim 1, wherein an additional loadbalancer may receive the packet and build an additional object that correlates the IP address associated with the end user to the selected gateway such that the additional object may be used to direct subsequently received additional packets associated with the end user to the selected gateway, the subsequently received additional packets being directed by the additional loadbalancer based on destination information included in the subsequently received additional packets.

3. The apparatus of claim 2, wherein the loadbalancers evaluate communication flows in one direction in order to direct the flows to the selected gateway based on a selected one of source and destination information.

4. The apparatus of claim 1, wherein the gateway is a selected one of a group of elements consisting of:
a firewall;
a switch;
an intrusion detection element;
gateway general packet radio service (GPRS) support node (GGSN);
a client service packet gateway (CSPG);
a packet data serving node (PDSN); and
a Layer-two tunneling protocol network server (LNS).

5. The apparatus of claim 1, wherein the loadbalancer includes a table operable to store the object that correlates the IP address of the end user to the selected gateway.

6. The apparatus of claim 1, wherein the gateway performs per-host operations based on an identity associated with the end user.

7. The apparatus of claim 1, wherein the loadbalancer includes one or more algorithms that may be used in order to determine which of the plurality of gateways is to receive the packet.

8. A method for tracking information in a loadbalancing environment, comprising:
receiving a packet included within a request made by an end; user requesting information from a server;
assigning the packet to a selected one of a plurality of gateways based on an Internet Protocol (IP) address of the end user making the request, the selected gateway configured to utilize the IP address to provide an accounting service to the end user;
building an object that correlates the IP address of the end user making the request to the selected gateway, the object used to direct subsequently received packets for the end user to the selected gateway;
directing the subsequently received packets based on the object and source information included in the subsequently received packets;
tracking a user data flow according to the IP address of the object; and
load balancing the user data flow based on the tracking according to the IP address.

9. The method of claim 8, further comprising:
building an additional object that correlates the IP address associated with the end user to the selected gateway such that the additional object may be used to direct subsequently received additional packets associated with the end user to the selected gateway; and
directing the subsequently received additional packets based on destination information included in the subsequently received additional packets.

10. The method of claim 9, further comprising:
evaluating communication flows in one direction in order to direct the flows to the selected gateway based on a selected one of the source and destination information.

11. The method of claim 8, further comprising:
storing the object that correlates the IP address of the end user to the selected gateway in a table.

12. The method of claim 8, further comprising:
executing one or more algorithms in order to determine which of the plurality of gateways is to receive the packet.

13. A system for tracking information in a loadbalancing environment, comprising:
means for receiving a packet included within a request made by an end user requesting information from a server;
means for assigning the packet to a selected one of a plurality of gateways based on an Internet Protocol (IP) address of the end user, user making the request, the selected gateway configured to utilize the IP address to provide an accounting service to the end user;
means for building an object that correlates the IP address of the end user making the request to the selected gateway, the object may be used to direct subsequently received packets for the end user to the selected gateway;
means for directing the subsequently received packets based the object and on source information included in the subsequently received packets;
means for tracking a user data flow according to the IP address of the object; and
means for load balancing the user data flow based on the tracking according to the IP address.

14. The system of claim 13, further comprising:
means for building an additional object that correlates the IP address associated with the end user to the selected gateway such that the additional object may be used to direct subsequently received additional packets associated with the end user to the selected gateway; and
means for directing the subsequently received additional packets based on destination information included in the subsequently received additional packets.

15. The system of claim 14, further comprising:
means for evaluating communication flows in one direction in order to direct the flows to the selected gateway based on a selected one of the source and destination information.

16. The system of claim 13, further comprising:
means for storing the object that correlates the IP address of the end user to the selected gateway.

17. The system of claim 13, further comprising:
means for executing one or more algorithms in order to determine which of the plurality of gateways is to receive the packet.

18. One or more computer-readable storage media encoding software for tracking information in a loadbalancing environment, the software executed by a processor, the software:
receiving a packet included within a request made by an end user requesting information from a server;
assigning the packet to a selected one of a plurality of gateways based on an Internet Protocol (IP) address of the end user making the request, the selected gateway configured to utilize the IP address to provide an accounting service to the end user;
building an object that correlates the IP address of the end user making the request to the selected gateway, the object used to direct subsequently received packets for the end user to the selected gateway;
directing the subsequently received packets based on the object and source information included in the subsequently received packets;
tracking a user data flow according to the IP address of the object; and
load balancing the user data flow based on the tracking according to the IP address.

19. The computer-readable storage media of claim 18, wherein the code is further operable to:
  building an additional object that correlates the IP address associated with the end user to the selected gateway such that the additional object may be used to direct subsequently received additional packets associated with the end user to the selected gateway; and
  directing the subsequently received additional packets based on destination information included in the subsequently received additional packets.

20. The computer-readable storage media of claim 19, wherein the code is further operable to:
  evaluating communication flows in one direction in order to direct the flows to the selected gateway based on a selected one of the source and destination information.

21. The computer-readable storage media of claim 18, wherein the code is further operable to:
  storing the object that correlates the IP address of the end user to the selected gateway.

22. The computer-readable storage media of claim 18, wherein the code is further operable to:
  executing one or more algorithms in order to determine which of the plurality of gateways is to receive the packet.

* * * * *

UNITED STATES PATENT AND TRADEMARK OFFICE
CERTIFICATE OF CORRECTION

PATENT NO. : 7,650,402 B1 Page 1 of 1
APPLICATION NO. : 10/606438
DATED : January 19, 2010
INVENTOR(S) : Batz et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1334 days.

Signed and Sealed this

Twenty-third Day of November, 2010

David J. Kappos
*Director of the United States Patent and Trademark Office*